United States Patent [19]
Blackwell

[11] 3,788,141
[45] Jan. 29, 1974

[54] FLOW METER
[75] Inventor: Robert E. Blackwell, Pittsburgh, Pa.
[73] Assignee: Westinghouse Electric Corporation, Pittsburgh, Pa.
[22] Filed: Aug. 27, 1971
[21] Appl. No.: 175,463

[52] U.S. Cl............................................... 73/194 B
[51] Int. Cl. .............................................. G01f 1/00
[58] Field of Search .. 73/194 B, 194 A, 194 E, 189; 181/.5 NP

[56] References Cited
UNITED STATES PATENTS
3,680,375  8/1972  Joy et al............................ 73/194 B
2,328,546  9/1943  Cafarelli, Jr. ................. 181/.5 NP X

*Primary Examiner*—Jerry W. Myracle
*Attorney, Agent, or Firm*—F. H. Henson et al.

[57] ABSTRACT

Disclosed are a method and apparatus for determining the velocity of relative movement between a fluid and a body in the fluid around which the fluid divides and in front of which oscillations are generated in the fluid as a result of the meeting between the fluid and the frontal aspect of the object. An acoustic signal is propagated toward the fluid oscillations in front of the object for interaction with the fluid oscillations to thereby modulate the acoustic signal, and the modulated acoustic signal is picked up by a transducer which converts it to a corresponding signal having a variable that is a function of the relative velocity between the fluid and the object. The corresponding signal is employed to determine the relative velocity by operating indicators in response to the signal or by controlling some process variable in response to the signal, for example a variable of relative fluid flow as by valve control of a fluid in a conduit, or speed control of an object in the fluid.

9 Claims, 2 Drawing Figures

FLOW METER

BACKGROUND OF THE INVENTION

There are a number of known methods and systems for determining the flow or velocity of a fluid with respect to a stationary object or in a pipe or conduit. Methods which determine velocity from pressure loss sustain some fairly high inaccuracies. In magnetic flow meters, the fluid must be conductive. Positive displacement and turbine meters have moving parts which are sensitive to abrasion, corrosion and shock. Various other methods suffer from high cost.

A well-known technique makes use of the von Karman phenomenon, in which flow past an obstruction causes vortices to be shed alternatively from opposite sides of the obstruction to form what is known as the Karman vortex street in the wake of the obstruction. The vortex shedding frequency $f$ (in cycles/sec) (the frequency at which a pair of vortices are shed) may be written: $f = /S(v/d)$, where $v =$ flow velocity (ft./sec.), $d =$ diameter or other lateral dimension of obstruction (ft.), and $S =$ Strouhal number (dimensionless) which is constant over the useful Reynolds Number range and for circular cylinders is $= 0.2$. Thus, for a given obstruction, the vortex frequency is a direct measure of the fluid velocity. The above expression for $f$ is well known and its use and the derivation for it and $S$ may be found in standard published works on "fluid mechanics." It is also discussed in U.S. Pat. No. 3,116,639 and in CONTROL ENGINEERING, Dec., 1969, pages 73–75.

Some flow meters have been developed which count the vortices trailing off in the wake of the obstruction. In one such device, an acoustic beam projected laterally across the vortex street in the wake of the obstruction is modulated by the vortices in accordance with the shedding frequency, and the modulated beam is received and demodulated to extract the modulation frequency thus to provide a measure of the fluid velocity. In the aforementioned CONTROL ENGINEERING, Dec., 1969, pages 73–75, there is described a device using the Karman Vortex Phenomenon that makes use of the fact that the flow actually shifts somewhat from one side of the obstruction to the other as each vortex is formed. These lateral shifts are detected by two heated thermistors embedded in the upstream face of the obstruction to detect the changes of heat transfer caused by the alternating fluid shifts. Resulting resistance changes in the thermistors are used to develop signals related to the volumetric flow rate. This scheme has limitations in that the thermistors cannot respond to high frequency flow shifts. Also, at elevated fluid temperatures, the heated thermistors cannot readily detect changes in the heat transfer.

SUMMARY OF THE INVENTION

The present invention is directed to apparatus and methods for detecting a variable due to relative movement between a fluid an a body in the fluid, wherein an acoustic beam is propagated across the fluid relative flow path just ahead of the body to be modulated by the alternating lateral flow shifts occurring ahead of the body where the noise disturbances are minimum, instead of in the wake of the body, (the Karman Vortex Street). The modulated acoustic signal is received and resolved by suitable detection apparatus to provide a signal that has a periodic variable related to the periodicity of the alternating lateral fluid velocity shifts across the upstream face of the body. The method and apparatus of the present invention, wherein an acoustic beam is modulated ahead of the shedding body, provides a clearer indication of the shedding frequency as compared to the system wherein the acoustic beam is modulated in the wake of the body.

"Acoustic" is synonymous with "sound" and encompasses sub-sonic, sonic (audible), and ultra-sonic frequencies. Although the invention may be practiced in any of these frequency ranges, ultra-sonic frequencies are preferred. It may be noted that definitions herein relating to "acoustics" are those recognized in "Glossary of Oceanographic Terms," second edition, 1966, sponsored by the U.S. Naval Oceanographic Office and obtainable from the Department of Documents, U.S. Government Printing Office.

DESCRIPTION OF THE PREFERRED EMBODIMENT

Figure 1:
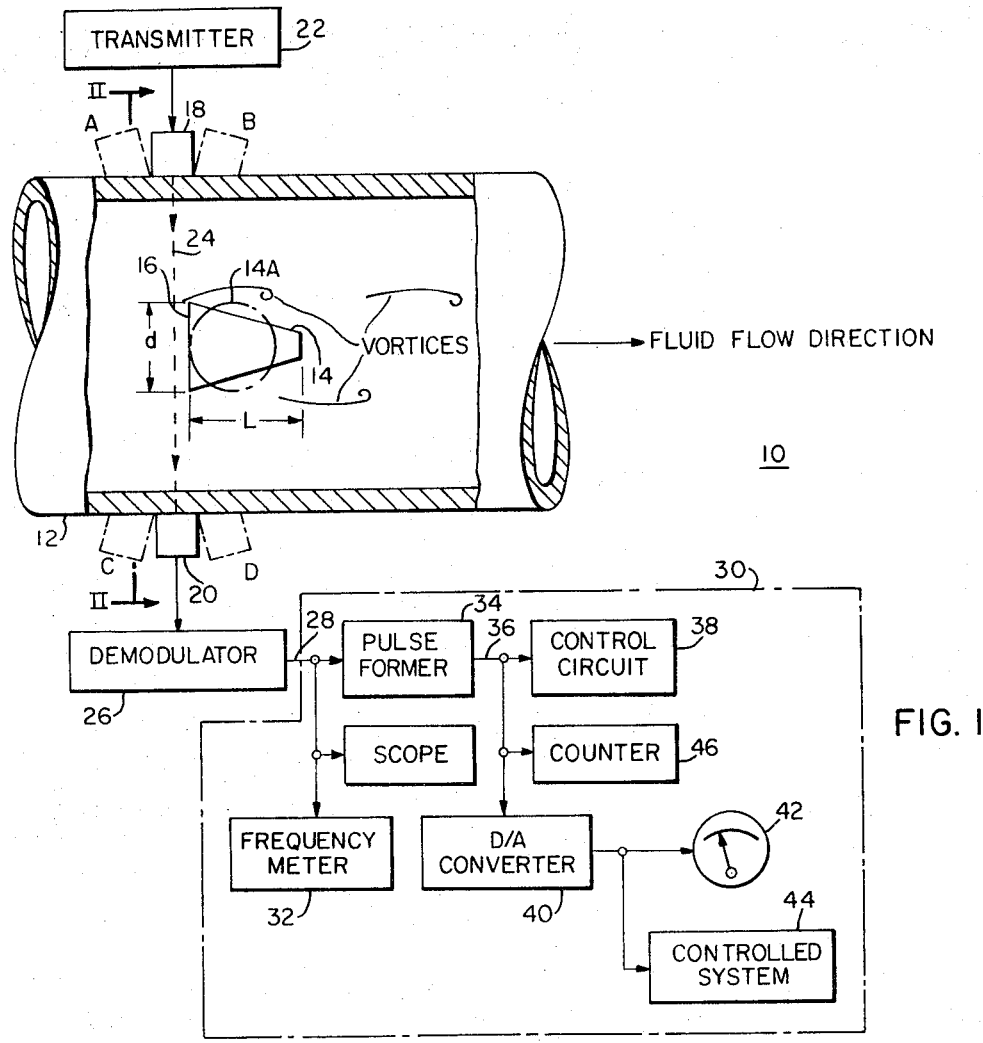
FIG. 1 includes structure and circuit block diagram, with parts of the structure broken away illustrating a preferred embodiment of the invention in connection with detection of flow parameters of a fluid in a pipe.
Figure 2:
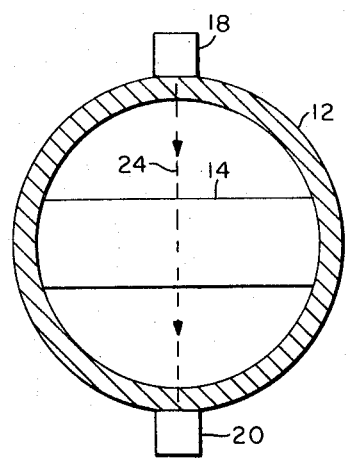
FIG. 2 is a sectional view of the fluid pipe of FIG. 1, the section being taken on line II—II of that figure.

Referring now to the drawings, a flow meter 10 includes a conduit 12 and a vortex shedding body 14 fixed within the conduit for generating oscillations in a fluid flowing through the conduit in the direction of the "fluid flow" arrow. By way of example, the body 14 is shown as an elongated strut disposed crosswise of the conduit 12 and having a polygonal wedge-shaped cross section, although it may be of any other suitable cross sectional configuration, such as circular, oval, triangular, etc. The circular cross-sectional example is symbolized by a dashed circle 14A. Regardless of the shape of the shedding body 14, it will have a "frontal aspect," i.e., a surface generally facing upstream, which surface meets the flowing fluid. This upstream surface for the polygonal example shown is indicated at 16. As hereinbefore pointed out, fluid oscillations are produced ahead of the shedding strut 14 as a concomitant to the shedding of Karman vortices alternately from opposite sides of the strut as the flowing fluid "divides" therearound. The zone of these oscillations is contiguous to and extends upstream from the frontal aspect of the strut 14 in diminishing intensity as the upstream distance from the strut 14 increases.

Coupled to the fluid, through the walls of the conduit 12 and on opposite sides thereof, are respective electroacoustical transducers 18 and 20, for example, of the piezoelectric type. Transducer 18 converts electric pulses received from a transmitter 22 into acoustic energy in the form of a beam 24, at least a part of which is directed laterally across the conduit and just ahead and crosswise of the strut 14, so that a beam of acoustic energy passes through the oscillation zone in front of the strut. The transmitter 22 comprises an oscillator arranged to excite the transducer 18 at a suitable frequency, for example, 5 MHZ. As the 5 MHZ acoustic beam passes through the fluid oscillation zone in front of the strut 14, it is modulated with pulsations in accordance with the frequency of the alternating lateral velocity shifts of the fluid which in turn is proportional to the fluid velocity. The modulation is primarily amplitude modulation. The transducer 20 is positioned to receive the modulated acoustic beam 24 and functions to convert the modulated acoustic beam to a corresponding electrical signal that is applied to the input of a detector 26 which detects the modulation component of the signal. The detector 26 demodulates the received signal and provides on an output line 28 the information part or pulsations having the modulation frequency of the signal.

The modulator (detector) 26 may, for example, be any well known half wave rectifier and filter arrangement for developing an output of the modulation frequencies while filtering out the carrier and other unwanted frequencies.

The demodulated signal on line 28 is applied to a response circuit 30 that responds to the pulsations either by sensing the frequency thereof, and thereby the fluid flow velocity, or by counting the pulsations over an elapsed time to indicate quantity of fluid flow. The response circuit 30 may comprise any suitable pulsation responsive arrangement, for example, one or more of the response arrangements shown within the dashed line box 30. One response arrangement may be a frequency meter 32 calibrated in terms of fluid velocity. Another response arrangement may include a pulse shaper or former 34 for providing output pulses on a line 36 at a pulse rate corresponding to the fluid oscillations ahead of the shedding strut 14, and a circuit or device which responds in accordance with the pulse rate. Once such circuit may be a control circuit 38 for controlling fluid flow parameters in accordance with the pulse rate. Another such pulse responsive system may include a digital to analog converter 40 whose output is connected to a suitably calibrated meter 42 and/or a controlled system 44 which may be utilized to control process variables, for example, fluid flow variables.

The pulse output on line 36 may be fed to a counter 46 for counting the pulses to provide an indication of total quantity of fluid flow within a certain period of time. Various types of displays may be connected to the output of the demodulator or the output of the pulse former 34.

From the above, it should be apparent that the circuit 30, although not restricted thereto, may for example, include such frequency or pulse responsive system as fluid flow rate indicators, total fluid flow quantity indicators, and control systems.

In a working example, some of the dimensions approximately were as follows: conduit 12 internal diameter—2 in.; dimension $d$ across strut 14—0.6 in.; and dimension L of strut 14—0.9 in. The carrier frequency of the acoustic beam 24 projected by the transducer 18 was approximately 5 MHZ. The diameter of the output "window" of the transducer 18 was about three-sixteenths inches, and the width of the beam about the same. In the working example, the transmitting and receiving transducers 18 and 20 were diametrically opposite each other across the conduit 12, and the centerline of the acoustic beam 24 was about 0.05 inches upstream of the strut 14.

With the above working example, at flow velocities of 3 ft./sec and 6 ft./sec, the vortex shedding frequencies observed on a scope (oscilloscope) were approximately 20/CPS and 36/CPS, respectively.

The disclosed dimensions, configurations, and embodiments are by way of example only, and any other suitable configurations and relations may be employed to implement the invention.

It should be further understood that, although a diametrically opposed position relationship for the transducers where the receiver transducer is in line with the axis of the acoustic beam as projected from the transmitting transducer is preferred, other relative positions of the transducers may be employed. They may still be in line along the acoustic beam, but not necessarily diametrically across from each other, for example, in FIG. 1 the transmitting and receiving transducers 18 and 20 may be at points A and D, respectively, with the acoustic beam from A pointed toward D. Likewise, transducers 18 and 20 could be at points B and C, with the acoustic beam from B pointed toward C. In both above cases, the acoustic carrier beam passes through the fluid oscillation zone in front of the strut 14 and is thereby modulated with an oscillation frequency in accordance with the relative velocity between the fluid and the strut. Also, it is within the purview of the invention to deploy the receiver transducer to one side of the central axis of the acoustic beam so that the receiver transducer responds to any or all of refracted, reflected, and scattered components of the modulated acoustic beam. For example, transducer 18 could be located as shown in FIG. 1, but with the transducer 20 located to one side of the axis of the beam as at C. It is believed that sensitivity and signal strength will be the greatest when the positions of the transducers are diametrically opposed across the oscillation zone in front of the strut 14.

Alternatively, both transducers could be located on the same side of the conduit, for example, the transmitting transducer 18 could be in the position shown, while the receiving transducer could be at position A, so that the acoustic beam is projected by the transmitter transducer into the oscillation zone where it is modulated, and reflections of the modulated acoustic energy are received by the receiving transducer for resolution by the disclosed circuits into frequency or pulse information indicative of fluid flow parameters. In somewhat the same manner, both transducers could be embedded in the front face of the strut 14 to face upstream, whereby the acoustic beam is projected by the transmitter transducer into the oscillation zone where it is modulated, and reflections of the modulated acoustic energy are received by the receiving transducer for further processing in the manner aforesaid.

Since the Strouhal number is relatively independent of velocity, the vortex shedding frequency or modulation frequency is directly proportional to relative velocity between the fluid and the obstruction or strut. Thus, detection of the modulation frequency of the acoustic signal provides an indication of velocity. Because the Strouhal number is independent of fluid characteristics, such as density and pressure, the resulting velocity signal is also independent of such characteristics.

Although the modulation of the acoustic beam 24 by the oscillating fluid is primarily amplitude modulation, there are components of phase and frequency modulation either of which could be detected by known detector arrangements to provide the desired signal on line 28. Thus, there is a choice of demodulation or detection techniques involving any of amplitude, phase, or frequency modulation, which may be used in the demodulator 26.

It should be understood that the herein described arrangements are simply illustrative of the principles of the invention, and that other embodiments and applications are within the spirit and scope of the invention.

I claim:

1. Apparatus for use in determining a measure of relative fluid flow, said apparatus comprising:
   a. A body adapted to be disposed in said fluid to cause a division of fluid flow around the body and when so disposed, the body having a frontal aspect that meets the fluid head on, the relative movement between the fluid and said body causing the production of fluid oscillations in a fluid zone forwardly of and contiguous to said frontal aspect, said oscillations having an occurrence measure that is a function of said relative fluid flow measure;
   b. Acoustic signal-providing means for providing an original acoustic signal propagated into said zone for interaction with the oscillating fluid whereby the acoustic signal is modulated with pulsations by the oscillating fluid to create a modulated acoustic signal; and
   c. Response means including means for receiving at least a portion of said modulated acoustic signal and converting it to a corresponding signal of different energy form.

2. The combination as in claim 1 wherein said response means includes means responsive to said corresponding signal for determining said relative fluid flow measure.

3. The combination as in claim 1 wherein said response means includes means responsive to said corresponding signal for determining an occurrence measure of modulation pulsations of said received acoustic signal.

4. The combiantion as in claim 3 wherein said relative fluid flow measure is the velocity of relative movement between said fluid and said body, and said occurrence measure of modulation pulsations is the frequency thereof.

5. The combination as in claim 3 wherein said relative fluid measure is quantity of fluid flow, and said occurrence measure of modulation pulsations is a count thereof.

6. The combination as in claim 1 wherein:
   a. said apparatus includes conduit means for carrying said fluid, and said body is fixed within said conduit means;
   b. said acoustic signal-providing means comprises transmitting transducer means fixed relative to said conduit means and arranged to project an acoustic beam through the oscillating fluid just ahead of said body to be modulated by the oscillating fluid; and
   c. said response means comprises receiving transducer means fixed relative to said conduit means and arranged to receive at least a portion of the modulated acoustic signal.

7. The combination as in claim 6 wherein said transmitting and receiving transducer means are respectively located forwardly of said body and on opposite sides of the main flow axis of the fluid.

8. The combination as in claim 6 wherein said receiving transducer means is arranged and located so as to be responsive to a refracted portion of said projected acoustic beam.

9. The combination as in claim 6 wherein said receiving transducer means is arranged and located so as to be responsive to a reflected portion of said projected acoustic beam.

* * * * *